(No Model.)

M. RUBIN.
STOPPER.

No. 521,047. Patented June 5, 1894.

WITNESSES:
William Goebel
C. Sedgwick

INVENTOR
M. Rubin
BY
Munn & Co
ATTORNEYS.

UNITED STATES PATENT OFFICE.

MAX RUBIN, OF NEW YORK, ASSIGNOR TO THE AUTOMATIC FAUCET COMPANY, OF BROOKLYN, NEW YORK.

STOPPER.

SPECIFICATION forming part of Letters Patent No. 521,047, dated June 5, 1894.

Application filed January 9, 1894. Serial No. 496,245. (No model.)

*To all whom it may concern:*

Be it known that I, MAX RUBIN, of New York city, in the county and State of New York, have invented a new and useful Improvement in Stoppers, of which the following is a full, clear, and exact description.

My invention relates to stoppers adapted for use in connection with bottles of any description, cans, or other receptacles, and it has for its object to provide a stopper which may be removed from its casing when desired, and to so construct the stopper and casing that the stopper may be expeditiously and conveniently elevated to permit the contents of the can, bottle or other receptacle to which the stopper is applied, to be poured out from the spout connected with the casing of the stopper and with a support adjacent thereto; and whereby further when the stopper is carried downward or lowered within the casing, the said stopper will so seat itself as to render the bottle, can or other receptacle practically air-tight, completely closing its outlet-orifice, and whereby when the stopper is seated a cover will be simultaneously brought over the spout, or equivalent exit employed upon the exterior of the can or receptacle, the said cover serving to effectually exclude dust from the said spout.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
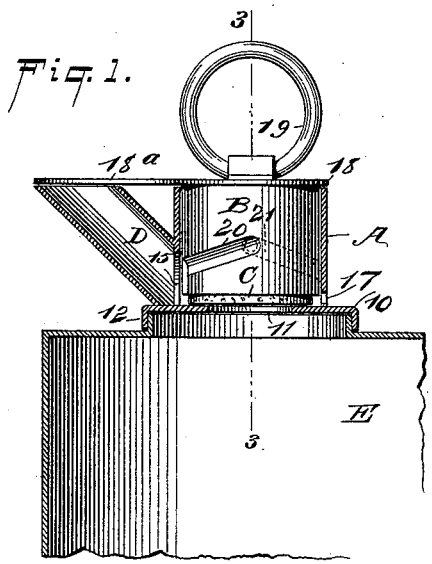
Figure 2:
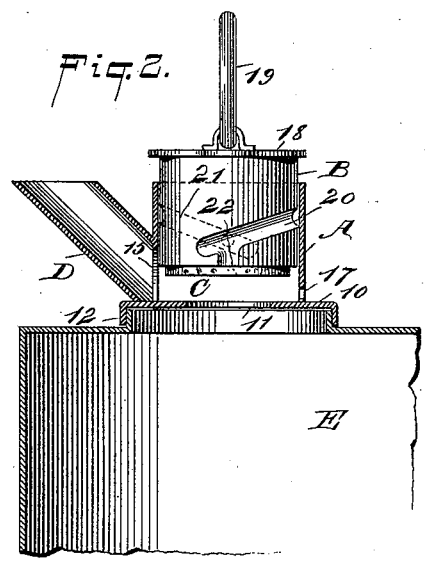
Figure 3:
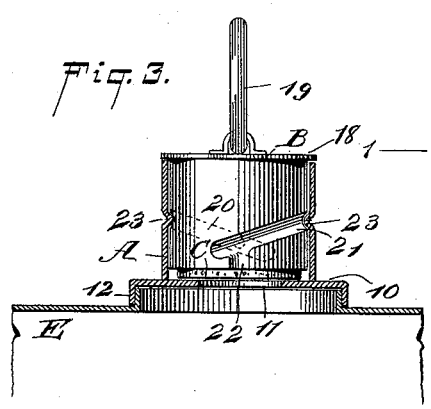
Figure 4:
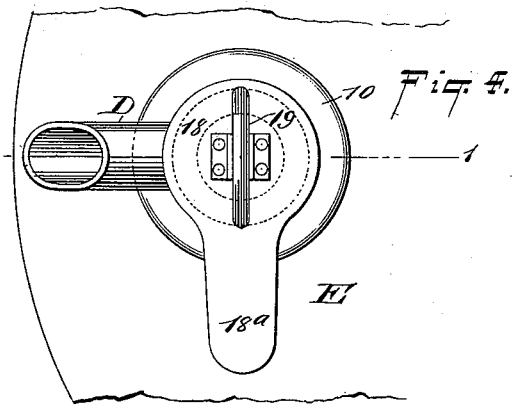
Figure 5:
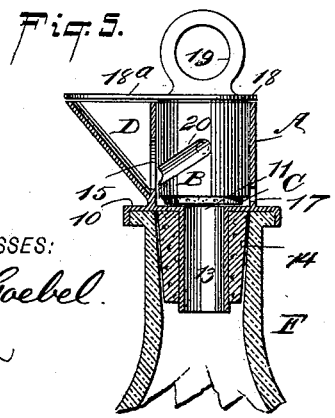
Figure 6:
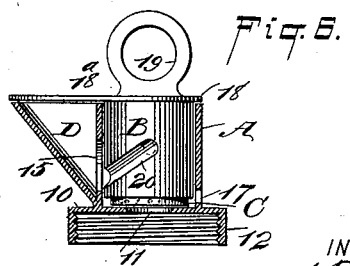

Figure 1 is a vertical section through the shell of the stopper, the barrel being shown in side elevation, the said section being taken practically on the line 1—1 of Fig. 4, the stopper in this view being illustrated as applied to a can. Fig. 2 is a section similar to that shown in Fig. 1, the barrel or stopper, however, being shown in an elevated position in this view, it being shown seated in Fig. 1. Fig. 3 is a section taken through the stopper at right angles to the section shown in Figs. 1 and 2, and practically on the line 3—3 of Fig. 1, the stopper being shown in its seated position. Fig. 4 is a broken plan view of the device applied as in Figs. 1, 2 and 3. Fig. 5 is a sectional view through the casing and through the mouth of a bottle, the barrel of the stopper being shown in side elevation, and in this view the device is shown slightly modified in order that it may be adapted to a bottle; and Fig. 6 is a section through a further modified form of the stopper, the said section being substantially the same as that shown in Fig. 5, the stopper, however, being constructed in such a manner as to make it applicable to a screw-mouthed receptacle.

In carrying out the invention the stopper consists primarily of a shell A, a barrel B containing a filling or packing C, and a spout D, connected with or carried by the shell. The shell A, is preferably circular in horizontal section, but it may be given any other desired shape, and the said shell is provided with a base or bottom 10, which extends within the shell, and the central portion of the base, or the central portion located within the shell, is provided with an aperture 11.

When the stopper is to be applied to a can E, for example, the base is made to extend a required distance beyond the outer face of the shell, and is provided with a downwardly-extending flange 12, through the medium of which it may be soldered, or permanently attached to the neck of a can E or like receptacle. When, however, the stopper is to be removably connected with the neck of the can, the said neck is provided with a thread, and a corresponding thread is formed upon the flange 12 of the base, and this latter form of stopper, which is shown in Fig. 6, is equally adapted for use in connection with bottles the necks of which are provided with a thread. When, however, the stopper is to be introduced into the neck F, of a bottle or like vessel as shown in Fig. 5, the base 10 is provided with a tube 13 surrounding its central aperture 11 and adapted to extend downward within the neck of the bottle, the said tube being surrounded by a cork or like packing 14. In the further construction of the barrel it is provided at one side with an opening 15, preferably located adjacent to the base, and the said opening is surrounded by a spout D, which may be integral with the body of the shell, or may be partially attached thereto and partially attached to the base, while immediately opposite the opening 15 leading into the spout the shell is provided with an air-vent 17 of suitable area.

The barrel or stopper proper B, as its name implies, is cylindrical and hollow, and it is closed at its top by a cover 18, extending beyond the periphery of the barrel, forming a flange adapted to engage with the upper edge of the shell. The cover 18 is further provided with a lip or extension 18$^a$, and a handle or ring 19 through the medium of which it is manipulated; and the said lip or extension 18$^a$, is adapted, when the stopper or barrel is seated in the shell, to cover the delivery end of the spout D, and thereby exclude dust from the spout, as illustrated in Figs. 1, 2, 5 and 6 of the drawings.

The barrel is preferably provided with two spiral grooves 20 and 21, one of which is shown in positive lines in Figs. 1, 2 and 3, and the other in dotted lines in the same figures. These spiral grooves are located at diametrically opposite sides of the barrel, and extend from a point near the lower edge of the barrel in an upwardly and spiral direction; and in the preferred form of stopper or barrel the lower ends of the spiral grooves 20 and 21 are substantially in diametrical alignment, as shown in Fig. 2, and the same is true of the upper ends of the grooves, as illustrated in Fig. 1. At the lower end of each groove a vertical channel 22, is produced in the shell or stopper, the said vertical channel being carried to the lower edge thereof. Thus each spiral groove is provided at its lower end with an extension at an angle thereto, as is clearly shown in Figs. 2 and 3.

The shell A, is provided with diametrically opposite inwardly-extending lugs 23, and these lugs are adapted to travel one in each of the spiral grooves 20 and 21 of the stopper or shell; and when the stopper or barrel is to be removed, or to be inserted into the shell, the lip thereof is carried over one of the lugs 23, or at an angle to the spout D, as shown in Fig. 4, and when the stopper or barrel is so placed the lugs will enter the spiral grooves 20 and 21, or leave said grooves through the channels or extensions 22 thereof. The barrel is further provided with a cork or equivalent filling C, and when the stopper or barrel is turned in a direction which will cause it to travel downward, the cork or packing C, will seat itself upon the base and cover or close the base opening 11, thus sealing the bottle or can to which the stopper may be applied, in an air-tight manner, and at the same time the lip 18$^a$, will be carried over the spout to close the same, as shown in Fig. 1. When it is desired to pour out the contents of the can, bottle, or other receptacle, the stopper or barrel is turned in an opposite direction, whereupon it will be elevated to the position shown in Fig. 2, owing to the spiral formation of the grooves 20 and 21; and when so elevated the lip 18$^a$, will uncover the spout, be placed at right angles thereto, as shown in Fig. 4, and by tilting the can, bottle or other receptacle, the contents thereof will escape through the base opening 11 and the opening 15 in the shell to the spout, from whence it may be poured into any receptacle placed to receive said contents.

This stopper is exceedingly simple, durable and economic in its construction, and its operation may be readily understood by any one of ordinary intelligence; and when the stopper is seated in its shell, dust is not only excluded from the outlet spout of the receptacle, but any receptacle to which the stopper is applied will be sealed in substantially an air-tight manner.

Having thus described my invention, I claim as new and desire to secure by Letters Patent—

1. A stopper, comprising a shell having an inlet in its bottom and provided with a spout leading from one side near the bottom, and a plug valve having a closed lower end and fitted to travel up and down in the shell, said valve being provided at its upper end with a lip adapted to close over the outer end of the spout, when the valve is seated in the shell, to close the inlet thereof and the delivery end of the spout, substantially as described.

2. A stopper, the same consisting of a shell provided with an air vent, a base, an inlet in said base, and a spout adjacent to said base, and a barrel fitted to turn in the shell, provided with a lip adapted to cover the spout, and spiral grooves in opposite faces, lugs located upon the shell, entering the said grooves in the barrel, and a facing of yielding material secured to said barrel and adapted to close the inlet in the base, the lip being so located upon the barrel that when the yielding surface thereof closes the inlet of the shell, the lip will close said spout, substantially as described.

3. A stopper, the same consisting of a shell provided with an air vent, a base, and an inlet in said base also provided with a spout adjacent to said inlet, and a barrel fitted to turn in the shell, provided with a lip adapted to cover the spout, and spiral grooves in opposite faces, provided with branches extending to one edge, lugs located upon the shell, entering the said grooves and capable of traveling in the branches thereof, and a yielding material secured in the bottom of the barrel, adapted to close the inlet in the base of the shell, said lip being so located upon the barrel that when the yielding surface thereof closes the inlet of the shell the lip will close said spout, and whereby also when the barrel is raised the spout and inlet of the shell will be in communication, and whereby further the barrel may be removed from the shell, as specified.

MAX RUBIN.

Witnesses:
J. FRED ACKER,
C. SEDGWICK.